UNITED STATES PATENT OFFICE.

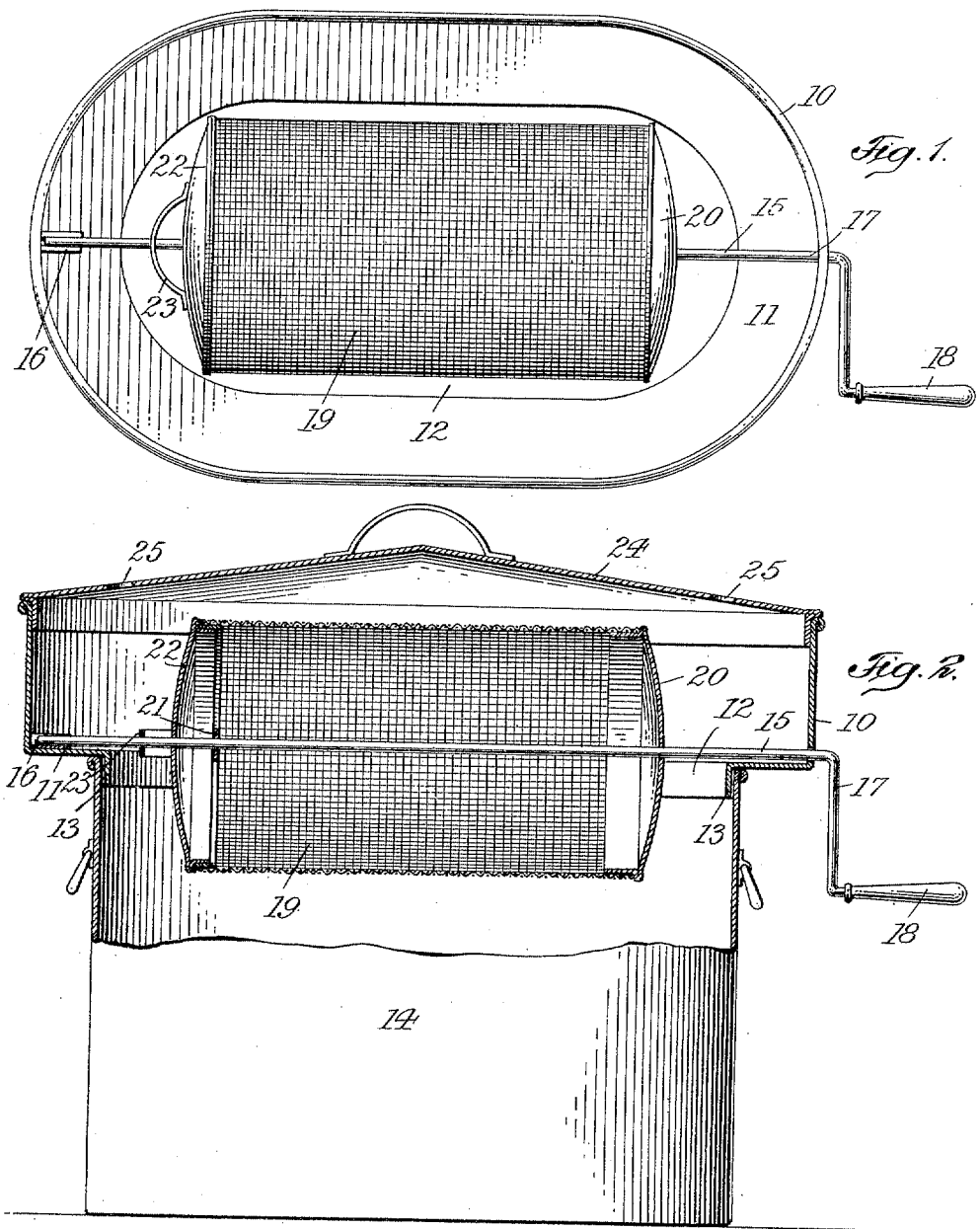

EMILIE GREINER, OF HOBOKEN, NEW JERSEY.

FEATHER-RENOVATOR.

983,549.  Specification of Letters Patent.  Patented Feb. 7, 1911.

Application filed September 15, 1910. Serial No. 582,173.

*To all whom it may concern:*

Be it known that I, EMILIE GREINER, a citizen of the German Empire, residing at Hoboken, county of Hudson, and State of New Jersey, have invented new and useful Improvements in Feather-Renovators, of which the following is a specification.

This invention relates to a feather renovator of novel construction, more particularly intended for household use.

The renovator is adapted to be fitted upon an ordinary wash boiler, which on being partly filled with water and placed over a fire, will generate steam that ascends directly into the renovator and rejuvenates the feathers contained therein.

In the accompanying drawing: Figure 1 is a plan of a feather renovator embodying my invention, with the lid removed, and Fig. 2 a longitudinal section of the renovator showing it mounted upon a wash boiler.

An oblong vessel 10 having curved ends, is provided with a correspondingly shaped bottom 11, of uniform width and having a central oblong opening 12. The inner edge of bottom 11 is turned down to form a depending flange 13, adapted to removably engage the mouth of a conventional wash boiler 14. The correlation of the parts is such that vessel 10 is both longer and wider than boiler 14, so that it will overhang the same when seated. Longitudinally through vessel 10 extends a tiltable shaft 15, one end of which removably engages a bearing 16 formed on bottom 11, while its other cranked end 17 passes out of vessel 10 and carries a grip 18. Upon shaft 15 is centered a wire gauze or open work drum 19, having a fixed head 20 fast on shaft 15, at the cranked end 17 thereof. At its other open end, drum 19 is provided with a diametrically extending cross arm 21, which is also fast on shaft 15. This open end of drum 19 is adapted to be closed by a removable head or cover 22, having a central aperture for accommodating shaft 15. To cover 22 is secured a handle 23 which is also centrally apertured for the passage of shaft 15, so that the cover is slidable along the shaft, which constitutes a support and guide for the cover when the latter is opened. A lid 24, adapted to close vessel 10, is provided with a suitable number of steam outlets 25.

In use, lid 24 is raised, shaft 15 tilted to lift its free end off bearing 16, cover 22 is slid outward along the shaft to open drum 19 and the latter is charged with the feathers to be renovated, after which all the parts are returned to their normal positions. The renovator is then fitted upon wash boiler 14, partly filled with water, and when the latter is heated, the full volume of steam generated will ascend through opening 12 and rejuvenate the feathers in drum 19, which is rotated by grip 18, during the steaming process. When the operation is completed, the apparatus is raised off boiler 14, and after the feathers have dried, they are removed from drum 19. It will be seen that my improved renovator is well adapted for domestic purposes, inasmuch as it entirely dispenses with the use of steam pipes, couplings and steam generators, other than the ordinary wash boiler which is generally part of a household equipment. Moreover the feathers are subjected to an extensive steam range, while the renovator may be charged or emptied without disconnecting or removing the drum cover, the latter being always supported by the drum shaft, in its open position.

I claim:

1. A feather renovator comprising a wash boiler, and an overhanging vessel seated upon the same and having a flanged open bottom, and an open work drum journaled in said vessel.

2. A feather renovator comprising a vessel having an open bottom, a shaft extending through the vessel, an open work drum carried by said shaft, and an apertured cover for said drum which is slidable on the shaft.

3. A feather renovator comprising a vessel having an open bottom, a bearing within the vessel, a tiltable shaft extending through the vessel and engaging the bearing, an open work drum mounted on the shaft, and an apertured cover for said drum which is slidable on the shaft.

4. A feather renovator comprising a vessel having a flanged open bottom, a bearing within said vessel, a tiltable shaft extending through the vessel and engaging the bearing, an open work drum having a fixed head and a cross arm which are fast on said shaft, and an apertured cover for said drum which is slidable on the shaft.

EMILIE GREINER.

Witnesses:
 FRANK V. BRIESEN,
 KATHERYNE KOCH.